(12) United States Patent
Maier et al.

(10) Patent No.: US 9,115,846 B2
(45) Date of Patent: Aug. 25, 2015

(54) HOLDING ELEMENT AND CONTROL MODULE WITH A HOLDING ELEMENT OF THIS TYPE

(75) Inventors: Herbert Maier, Marbach (DE); Karl-Friedrich Kuehner, Ilsfeld (DE)

(73) Assignee: Robert Bosch GmbH, Stuttgart, DE (US)

( * ) Notice: Subject to any disclaimer, the term of this patent is extended or adjusted under 35 U.S.C. 154(b) by 222 days.

(21) Appl. No.: 13/877,236

(22) PCT Filed: Oct. 7, 2011

(86) PCT No.: PCT/EP2011/067567
§ 371 (c)(1),
(2), (4) Date: Jul. 1, 2013

(87) PCT Pub. No.: WO2012/045865
PCT Pub. Date: Apr. 12, 2012

(65) Prior Publication Data
US 2013/0278050 A1    Oct. 24, 2013

(30) Foreign Application Priority Data

Oct. 8, 2010  (DE) .......................... 10 2010 042 177

(51) Int. Cl.
*F16M 13/02*  (2006.01)
*B60T 8/36*  (2006.01)
*B60T 8/175*  (2006.01)

(52) U.S. Cl.
CPC ................ *F16M 13/02* (2013.01); *B60T 8/175* (2013.01); *B60T 8/3685* (2013.01)

(58) Field of Classification Search
CPC ..... B29C 45/00; B29C 45/0003; B60T 13/40; B60T 13/662; B60T 13/683; B60T 15/027
USPC ......... 303/DIG. 10, 11, 14, 15; 248/538, 638, 248/539, 534
See application file for complete search history.

(56) References Cited

U.S. PATENT DOCUMENTS 4,120,446 A    10/1978  Fuemmeler
4,955,673 A     9/1990  Fukuda
(Continued)

FOREIGN PATENT DOCUMENTS

EP    2 048 051 A2    4/2009
GB       2464754 A  *  5/2010
(Continued)

OTHER PUBLICATIONS

International Search Report corresponding to PCT Application No. PCT/EP2011/067567, mailed Dec. 9, 2011 (German and English language document) (7 pages).

*Primary Examiner* — Melanie Torres Williams
(74) *Attorney, Agent, or Firm* — Maginot, Moore & Beck LLP

(57) ABSTRACT

A holding element, in particular for a hydraulic unit of a slip-controllable block vehicle braking system, includes at least one side wall which, at one end, has a receptacle for holding the hydraulic unit. The holding element further includes at least one fastening element for fastening the holding element to a support part, wherein the holding element is at least substantially designed as a single piece. The holding element is manufactured at least substantially from plastic and the side wall is provided with at least one stiffening rib which runs in a radial or radiated manner with respect to the receptacle.

13 Claims, 4 Drawing Sheets

(56) References Cited

U.S. PATENT DOCUMENTS

| | | |
|---|---|---|
| 6,171,540 B1 | 1/2001 | Ibaragi |
| 8,359,852 B2 * | 1/2013 | Gnamm et al. ................ 60/416 |
| 2004/0102888 A1 | 5/2004 | Burgdorf et al. |

FOREIGN PATENT DOCUMENTS

| | | |
|---|---|---|
| JP | 2000-350331 A | 12/2000 |
| JP | 2001-231080 A | 8/2001 |
| JP | 2009-214595 A | 9/2009 |

* cited by examiner

HOLDING ELEMENT AND CONTROL MODULE WITH A HOLDING ELEMENT OF THIS TYPE

This application is a 35 U.S.C. §371 National Stage Application of PCT/EP2011/067567, filed on Oct. 7, 2011, which claims the benefit of priority to Serial No. DE 10 2010 042 177.4, filed on Oct. 8, 2010 in Germany, the disclosures of which are incorporated herein by reference in their entirety.

The disclosure relates to a retaining element, particularly for a hydraulic unit of a vehicle brake system with traction control, having a side wall, at the free end of which a mount is provided for the positively interlocking and/or non-positive retention of the hydraulic unit, and having at least one fastener for fastening the retaining element to a supporting part, the retaining element being at least substantially integrally formed.

The disclosure further relates to a control module, particularly for a vehicle brake system with traction control, comprising a hydraulic unit consisting of a hydraulic block and an electronic control unit, in which an angular rate sensor and/or an acceleration sensor are accommodated, and at least one retaining element retaining the hydraulic unit non-positively and/or through positive interlock.

BACKGROUND

Retaining elements for hydraulic units in motor vehicles are basically known from the state of the art. A significant feature of these is the attachment of the hydraulic unit to a supporting part of the motor vehicle. In order to afford a permanently fixed connection capable of sustaining mechanical stresses, a retaining element is provided with at least one fastener and at least one mount, the fastener serving to fasten the retaining element to a supporting part of the motor vehicle, such as a vehicle body part, for example, and the mount serving to retain the hydraulic unit on the retaining element. In order to afford strength and rigidity and hence a stable registering of useable electronic signals by the hydraulic unit, the known retaining element is at least substantially integrally formed from steel. Such a retaining element takes some effort to manufacture, however, and results in a relatively heavy component.

SUMMARY

According to the disclosure it is therefore proposed to manufacture the retaining element at least substantially from plastic. Plastic is easier to form and process than steel, consequently reducing the costs of manufacturing the retaining element. Moreover, the weight of the retaining element is reduced, affording further advantages, since in the automotive industry, in particular, great importance is attached to the weight of individual components, particularly with regard to the fuel consumption. Through the choice of the plastic used and in particular through an appropriate forming of the retaining element, this can be manufactured so that it is just as rigid and load-bearing as a conventional steel retaining element. Here the retaining element has at least a first side wall, at the free end of which a mount of preferably circular cross section is formed. The first side wall moreover comprises at least one molded-on stiffening rib, which substantially runs radially to the circumference of the mount.

The stiffening rib or stiffening ribs is/are molded on, that is to say integrally formed with the retaining element. In the manufacture of the retaining element the stiffening ribs are preferably molded or formed by a corresponding mold and/or injection mold. The disclosed alignment and arrangement of the stiffening rib or stiffening ribs are a simple way of increasing the rigidity of the retaining element. In addition to the side wall, the retaining element may comprise a base, which is integrally formed with the side wall. At least one stiffening rib each is preferably formed on both the base and the side wall.

The stiffening rib or stiffening ribs is/are more preferably formed on the side of the base remote from the mount. The mount of the retaining element, in which the hydraulic unit is retained preferably by positive interlock, is preferably formed in the same operation as that in which the retaining element itself also receives its geometric form. The one side wall thus preferably has at least one mount, through which a screw or a bolt or the like can be passed and introduced into a thread or the like preferably formed in the hydraulic block. At a point on its circumference the mount has an opening, that is to say it is of radially open design, so that a screw already pre-fitted to the hydraulic block may be introduced by its respective shank laterally into the opening. This makes it easier, in particular, to fit the hydraulic unit to the retaining element.

The stiffening ribs of the retaining element are more preferably formed and arranged in such a way that the operating noise of the hydraulic unit audible in the surroundings when in traction control mode is reduced. The noise-optimized design serves to prevent vibrations that are manufactured particularly during operation, and in particular fulfills minimum requirements for the natural resonance and the amplitude peak of the control module. The stiffening ribs also reinforce the retaining element in such a way that rattling noises are avoided.

The chosen number, shape and profile of the stiffening ribs allow specific influencing of the natural resilience of the retaining element. The retaining element provided is to be at least locally of elastically deformable design, in order to damp the vibrations occurring and in order to prevent signal interference on the angular rate sensor or on the acceleration sensor. Additional elastic damping means to be arranged between the hydraulic unit and the retaining element can be dispensed with owing to the adjustable natural resilience of the retaining element, which in turn saves part and assembly costs and further reduces the weight.

According to an advantageous development of the retaining element, the fastener is embodied as a fastening clip. According to a preferred embodiment, the fastening clip is designed for insertion or introduction into corresponding fastening mounts of the supporting part, in order to afford a simple means of positively interlocking and possibly non-positive attachment of the retaining element to the supporting part. In order to form a latching connection and/or a damping element, the fastening clip is more preferably at least locally of elastically deformable design. The fastening clip is thus designed, for example, to produce a snap connection when the fastening clip is inserted into the fastening mount, a portion of the fastening clip in the fastening mount being displaced into a latching position due to its natural resilience. The embodiment as a damping element reduces or prevents the transmission of vibrations from the supporting part to the retaining element and to the hydraulic unit, and back.

According to an advantageous development of the retaining element, the fastening clip is provided with at least one opening, so that the retaining element can be easily and permanently anchored to the supporting part by means of a bolt or screw on the supporting part.

The fastening clip preferably comprises at least one reinforcing element, especially a metal one, which is at least locally enclosed by the plastic. The reinforcing element is preferably coated with plastic during manufacture of the retaining element, so that it is locally or entirely incorporated into the retaining element, in particular into the fastening clip of the retaining element.

The reinforcing element is more preferably embodied as a reinforcing sleeve, in particular as a metal sleeve, and is preferably arranged coaxially with the opening in the fastening clip. In particular, this affords a secure and permanent screwed connection between the fastening clip and the supporting part, since high contact pressures can be absorbed by the reinforcing sleeve. The openings in the fastening clips are preferably of the elongated hole type, particularly in order to allow an adjustment of the position of the retaining element on the supporting part. In this case, the form of the metal sleeve is preferably also of the elongated hole type. Alternatively, the opening in the fixing clip and/or the opening in the side wall may also have a circular cross section.

A distinguishing feature of the control module according to the disclosure is the embodiment of its retaining element according to the aforementioned specifications. The control module is therefore easy and inexpensive to fit; it can be permanently fastened securely to a supporting part of the motor vehicle, in particular to a body part of the motor vehicle, and it has a significantly reduced overall weight compared to conventional control modules.

BRIEF DESCRIPTION OF THE DRAWINGS

The disclosure will be explained in more detail below with reference to the drawings, in which.

DETAILED DESCRIPTION

Figure 1:
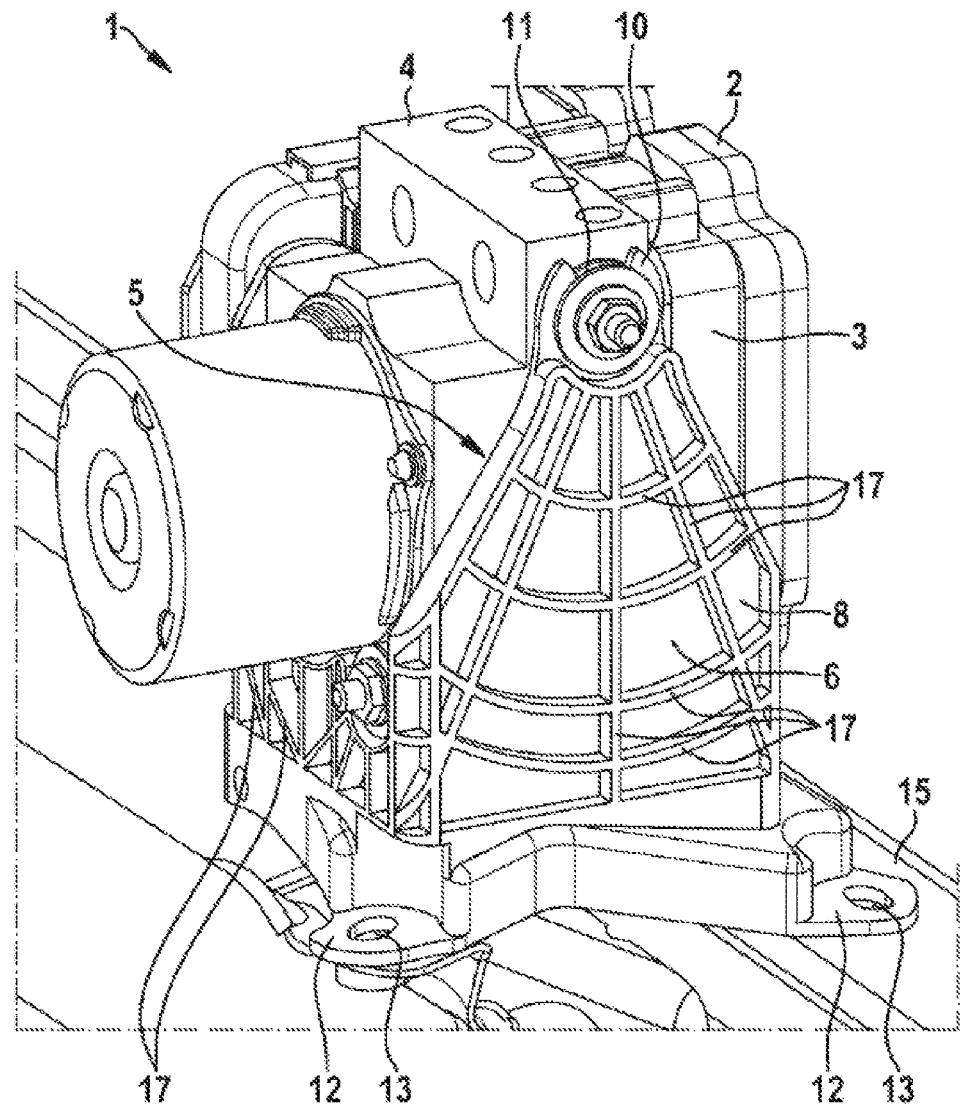
FIG. 1 shows a perspective representation of a retaining element with hydraulic unit, fixed to a supporting part.

FIG. 1 shows a perspective representation of a hydraulic unit 1 of a motor vehicle brake system with traction control. This hydraulic unit 1 comprises a hydraulic block 4 and an electronic control unit 3, which is arranged thereon and into which, for example, an angular rate sensor 2 and/or an acceleration sensor is integrated. The hydraulic unit 1 is accommodated in mounts 11 of a retaining element 6 and is fastened by means of this retaining element 6 to a supporting part 15, for example to a body part of a motor vehicle.

Figure 2:
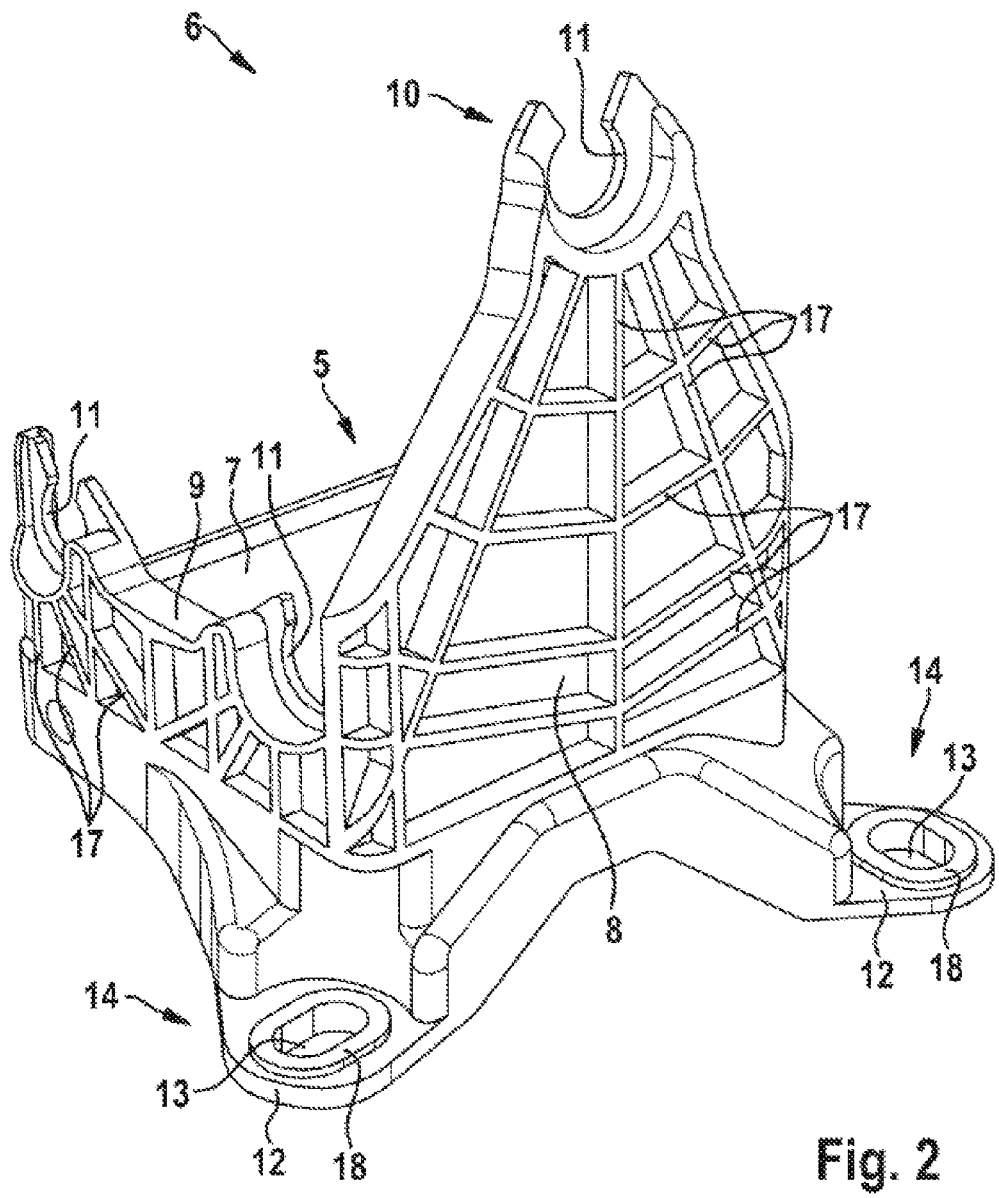
FIG. 2 shows a perspective representation of a retaining element as a detached component.

The retaining element 6 is shown in a perspective representation in FIG. 2. It is manufactured in one piece substantially from plastic and comprises a base 7, a first side wall 8 and at least a second side wall 9, each of which is integrally formed together with the base 7 and the other side wall in each case. The base 7 and the side walls 8 and 9 form a common corner with one another. The two side walls 8 and 9 stand substantially at right-angles to one another, the side wall 8 according to this exemplary embodiment being higher than the side wall 9. The width of the side wall 8 diminishes approximately from the height of the side wall 9 towards its free end 10. At its free end 10 the side wall 8 has a first mount 11 of substantially circular cross section. The mount 11 is formed radially or open at the edge, however, that is to say it has a radial opening through which a screw or a bolt, for example, can be laterally introduced by its respective shank. Two correspondingly formed mounts 11 are likewise provided on the side wall 9. The radial openings of all mounts 11 face in the same spatial direction, so that screws or bolts pre-fitted to the housing 4 can be readily introduced. In this way the hydraulic unit 1 can easily be accommodated and fastened on the retaining element 6.

On the base 7, the retaining element 6 comprises outwardly projecting fastening clips 12. Whilst only two fastening clips 12 are visible in FIGS. 1 and 2, the retaining element 6 is preferably equipped with three or more fastening clips 12. The fastening clips 12 are likewise integrally connected to the retaining element 6 and each have an opening 13 in the form of an elongated hole. The fastening clips 12 with the openings 13 formed therein serve as fasteners 14, by means of which the retaining element 6 can be fastened to the supporting part 15 represented in FIG. 1. The supporting part 15 may be a body part of a motor vehicle, for example.

A plurality of stiffening ribs 17, only some of which are here provided with reference numerals by way of example, is formed onto the retaining element 6. The stiffening ribs 17 are therefore integrally formed with the retaining element 6. On the side wall 8, in particular, the stiffening ribs 17 are formed and/or aligned in such a way that some of the stiffening ribs 17, running substantially coaxially with the circumference of the mount 11, extend over the rear side of the side wall 8, whilst other stiffening ribs 17 run substantially radially to the circumference of the mount 11. At least radially running stiffening ribs 17 are also provided on the mounts 11 of the side wall 9.

The stiffening ribs 17 are suitably designed and/or aligned in such a way that they permanently ensure the rigidity and continuous load-bearing capacity of the retaining element 6 manufactured from plastic and in particular ensure the functioning, free from signal interference, of the angular rate sensor 2 and/or the acceleration sensor integrated into the control unit 3.

FIG. 2 shows a development of the retaining element 6 represented in FIG. 1 in as much as reinforcing elements 18 are assigned to the fixing clips 12. The reinforcing elements 18 here are preferably manufactured from metal in the form of reinforcing sleeves and are arranged in the respective fastening clip coaxially with the respective opening 13. According to the exemplary embodiment represented in FIG. 2, the reinforcing elements 18 are completely enclosed by the plastic of the retaining element 6. The reinforcing elements 18 are suitably formed according to the elongated hole shape of the opening 13. The specific choice of material for the reinforcing elements 18 allows the retaining element 6 to be permanently fastened, by means of screws, for example, to any conceivable surface and to any conceivable supporting part 15, which may be manufactured from steel or aluminum, for example. The shank of these screws projects through the reinforcing elements 18, whilst the end face of the screw head is supported on the sleeve edge. The reinforcing elements 18 moreover increase the strength of the retaining element 6 specifically in the area of the fastening clips 12. Overall therefore, compared to known retaining elements in the state of the art, the retaining element 6 manufactured from plastic has a lower weight for the same rigidity.

Figure 3:
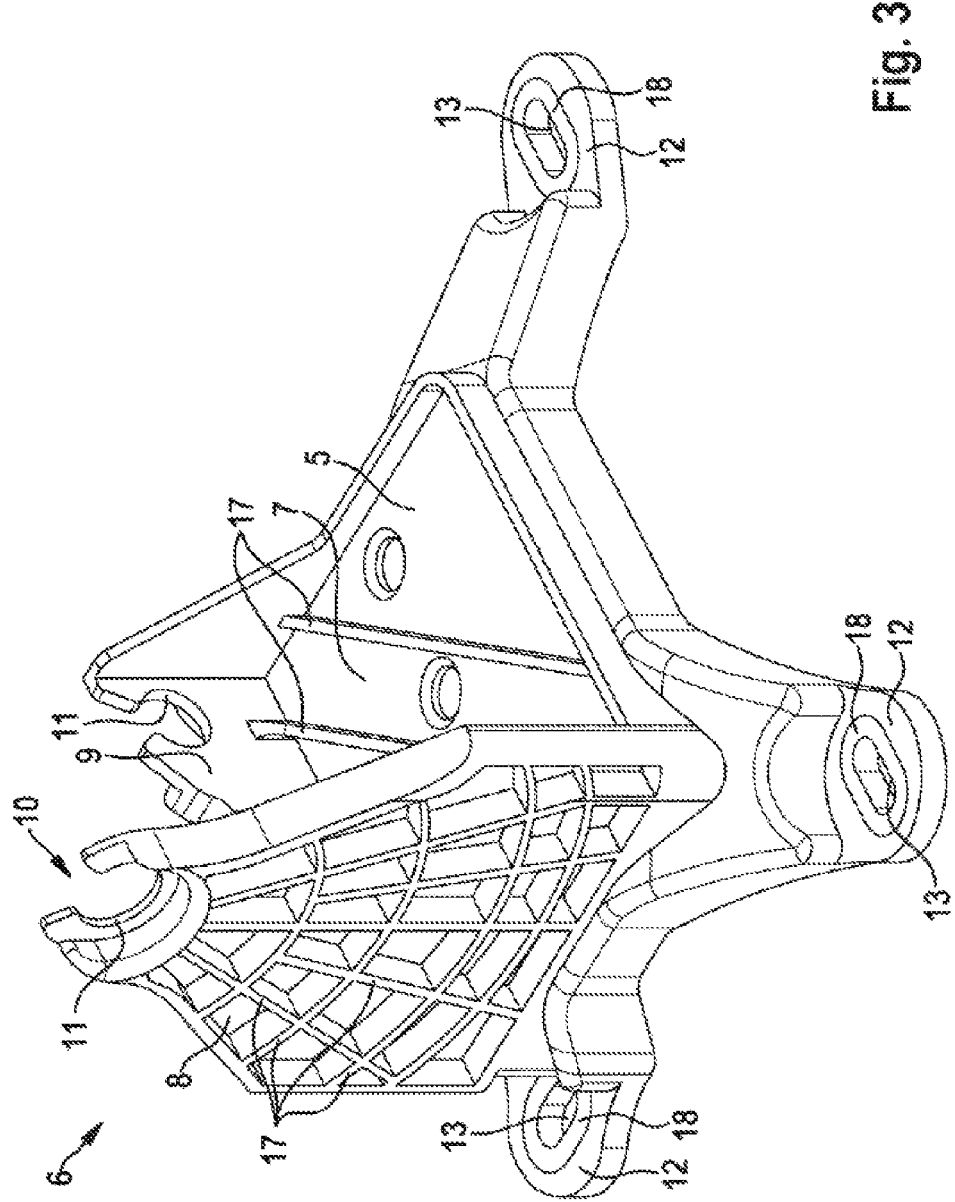
FIG. 3 shows a perspective representation of a second embodiment of the retaining element and FIG. 4 shows a likewise perspective representation of a third embodiment of the retaining element.

FIG. 3 shows a perspective representation of a further embodiment of the retaining element 6, which differs from the preceding embodiment in that additional stiffening ribs 17 are also provided or molded on the base 7 on the side thereof facing the mount 11. This representation moreover shows a third example of the fastening clips 12. The reinforcing elements 18 are coated along their outer shell wall with the plastic of the retaining element 6 or are enclosed by the respective fastening clip 12. This affords the particular advantage that the material for the reinforcing elements 18 can be selected according to the formation of the supporting part 15 (FIG. 1), in such a way that an especially secure and permanent connection can be ensured.

Figure 4:
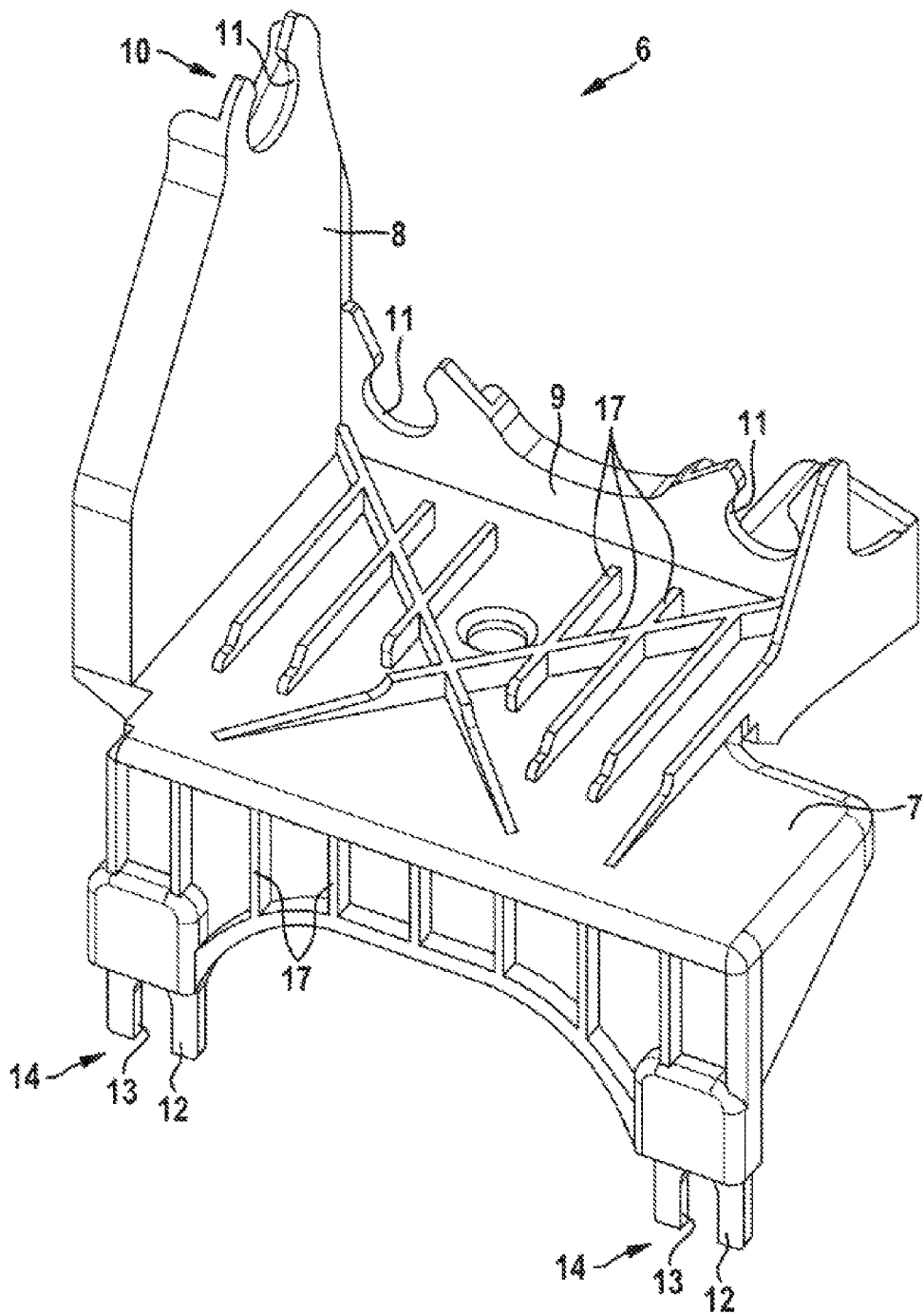

FIG. 4 shows a perspective representation of a further possible embodiment of the retaining element 6. According to this embodiment, the retaining element 6 differs from the preceding embodiment in that the fastening clips 12 are aligned perpendicularly to the base 7. In addition, the openings 13 are of an open-edge design. In an embodiment not represented here, the fasteners 14 may also be of an at least locally elastically deformable design, in order to act as damping elements. It is equally feasible to design the fasteners 14 so as to form a latching connection, for which purpose they are preferably of an at least locally elastically deformable design.

All stiffening ribs 17 are advantageously of noise-optimized design, in particular so that the requirements with regard to the mechanical stability of the retaining element 6 and the requirements for the first resonance frequency are fulfilled, so that the retaining element 6 and the hydraulic unit 1 are particularly suitable for applications in brake systems, such as, for example, ESP® systems (ESP®=electronic stability program) or ABS systems (ABS=antilock brake system) or also ASR systems (ASR=traction control). The features described above with reference to the various embodiments can obviously also be combined with one another in any suitable manner.

The invention claimed is:

1. A retaining element for a hydraulic unit of a vehicle brake system with traction control, comprising:
   a first side wall including (i) a fixed end region, (ii) an opposite free end region, which includes a first mount for positively interlocking and non-positive retention of the hydraulic unit, (iii) at least one first molded stiffening rib extending substantially radially relative to the first mount, and (iv) at least one molded second stiffening rib extending substantially coaxially with respect to the first mount;
   a base connected to the fixed end region and arranged in a plane perpendicular to the first side wall, the base including at least one third stiffening rib extending in a direction toward the first mount and at least one fourth stiffening rib extending in a direction away from the first mount:
   a second side wall arranged in a plane perpendicular to the base and the first side wall; and
   at least one fastener configured to fasten the retaining element to a supporting part,
   wherein the retaining element is at least substantially integrally formed,
   wherein the retaining element is manufactured at least substantially from plastic, and
   wherein the first side wall, the second side wall, and the base are connected to one another at a common corner.

2. The retaining element as claimed in claim 1, wherein the fastener includes a fastening clip extending away from the base.

3. The retaining element as claimed in claim 2, wherein the fastening clip defines at least one opening.

4. The retaining element as claimed in claim 3, wherein the fastening clip comprises at least one metal reinforcing element, at least locally coated with the plastic.

5. The retaining element as claimed in claim 4, wherein the reinforcing element is embodied as a sleeve.

6. The retaining element as claimed in claim 5, wherein the sleeve is arranged coaxially with the opening.

7. The retaining element as claimed in claim 1, wherein the plastic forming the first side wall, the second side wall, and the base is at least locally elastically deformable.

8. The retaining element as claimed in claim 1, wherein the second side wall includes a second mount.

9. The retaining element as claimed in claim 1, wherein the second side wall includes a fifth stiffening rib.

10. A control module for a vehicle brake system with traction control, comprising:
    a hydraulic unit having a hydraulic block and an electronic control unit, in which at least one angular rate sensor or acceleration sensor is accommodated; and
    at least one retaining element configured to receive the hydraulic unit by at least one of a non-positive connection and a positive interlock,
    wherein the at least one retaining element includes:
       a first side wall including (i) a fixed end region, (ii) an opposite free end region, which includes a first mount configured to receive the hydraulic unit by the at least one of the non-positive connection and the positive interlock, (iii) at least one first molded stiffening rib extending substantially radially relative to the first mount, and (iv) at least one molded second stiffening rib extending substantially coaxially with respect to the first mount;
       a base connected to the fixed end region and arranged in a plane perpendicular to the first side wall, the base including at least one third stiffening rib extending in a direction toward the first mount and at least one fourth stiffening rib extending in a direction away from the first mount;
       a second side wall arranged in a plane perpendicular to the base and the first side wall; and
       at least one fastener for fastening the at least one retaining element to a supporting part,
    wherein the at least one retaining element is at least substantially integrally formed,
    wherein the at least one retaining element is manufactured at least substantially from plastic, and
    wherein the first side wall, the second side wall, and the base are connected to one another at a common corner and define a mounting space in which the hydraulic unit is positioned.

11. The control module as claimed in claim 10, wherein the plastic forming the first side wall, the second side wall, and the base is at least locally elastically deformable.

12. The control module as claimed in claim 10, wherein the second side wall includes a second mount.

13. The control module as claimed in claim 10, wherein the second side wall includes a fifth stiffening rib.

* * * * *